Feb. 21, 1933.  E. G. SMITH  1,898,147
GATE VALVE
Filed Aug. 19, 1930   2 Sheets-Sheet 1

WITNESSES
INVENTOR
E. G. Smith,
BY
ATTORNEY

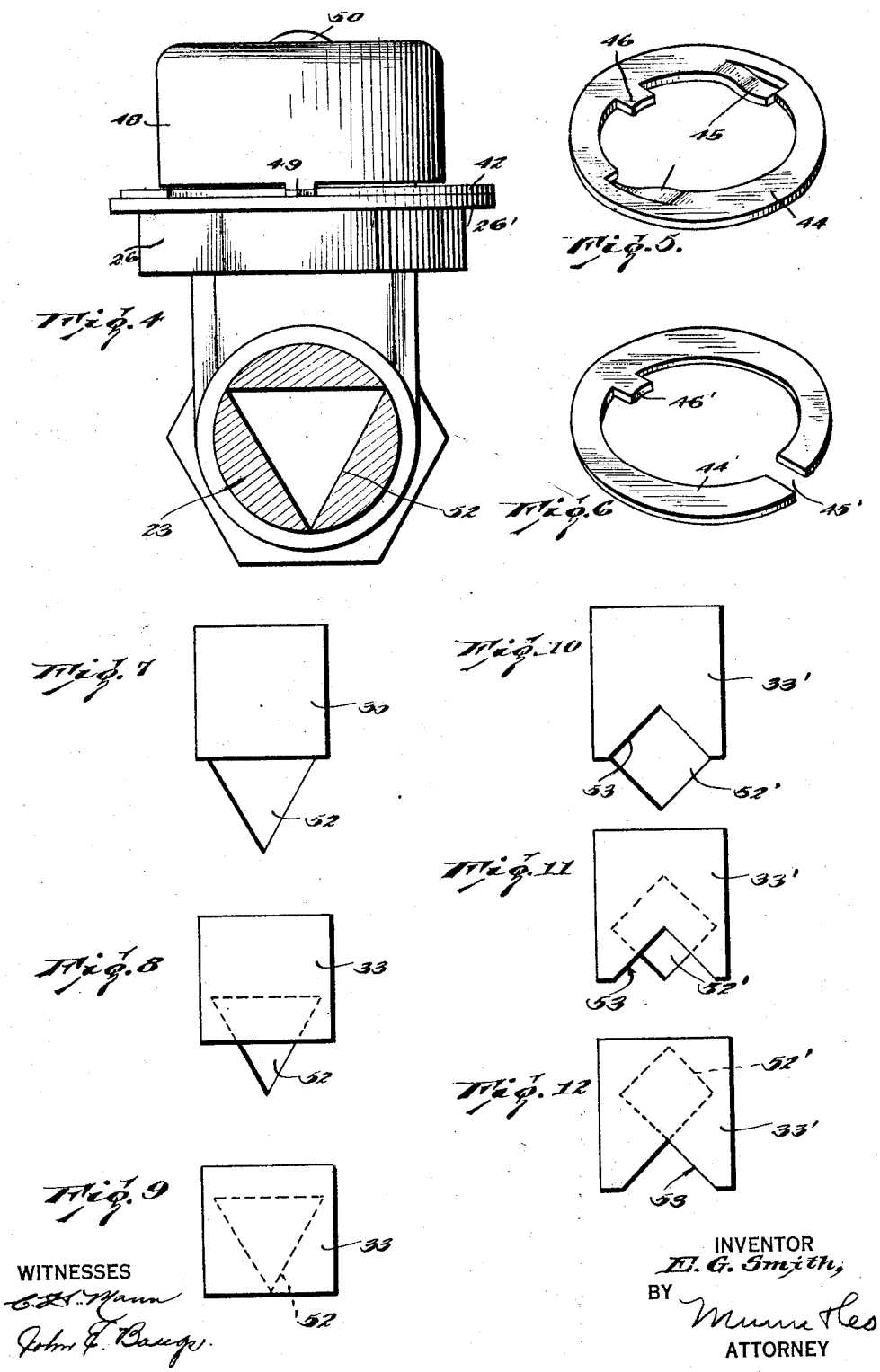

Patented Apr. 9, 1946

2,398,147

UNITED STATES PATENT OFFICE 2,398,147

AGRICULTURAL IMPLEMENT

Augusta Postelle McKay, Cedartown, Ga., assignor to Rome Plow Company, Cedartown, Ga., a corporation Application May 26, 1941, Serial No. 395,258

5 Claims. (Cl. 97—50)

This invention relates to improvements in means for connecting and operating agricultural implements and the like in connection with tractors.

The primary object of this invention is the provision of means for connecting an agricultural implement (such as a harrow) to a tractor, so that normally it will operate flexibly and freely upon the ground or material for which it is intended, in an efficient manner; improved lifting mechanism being associated with the tractor and implement to enable the latter to be entirely suspended, as will be desirable under some circumstances, such as when it is desired to transport the implement, or to make a short turn of the tractor.

A further object of this invention is the provision of improved means for bodily lifting and suspending a tractor drawn implement by means of a power take off from the tractor.

A further object of this invention is the provision of improved means to lift a double section implement bodily by means of a power take off from a tractor.

A further object of this invention is the provision of an improved implement lifting mechanism for tractors and like vehicles.

Other objects and advantages of this invention will be apparent during the course of the following detailed description.

In the accompanying drawings, forming a part of this specification, and wherein similar reference characters designate corresponding parts throughout the several views, Figure 1 is a side elevation of an agricultural implement, such as a two section harrow, flexibly and operatively connected to the rear end of a heavy duty tractor; the implement and the tractor having improved lift means associated therewith. This view shows the implement in a flexible ground operating position.

Figure 4 is a side elevation of an implement, such as a suspension disc harrow operatively connected with another type of draft and lifting mechanism of a lighter duty type tractor than that shown in Figure 1. This implement has been made the subject-matter of a co-pending application, now Reissued Patent 22,627, dated April 3, 1945.

Figure 5 is a plan view of the details shown in Figure 4.

Figure 6 is a view similar to Figure 4, but with the power take off and lift mechanism of the tractor operatively supporting the implement above a ground surface.

Figure 7 is a cross sectional view showing the association of the draw bar of the agricultural implement with a cross bar of the draft mechanism.

Figure 1:
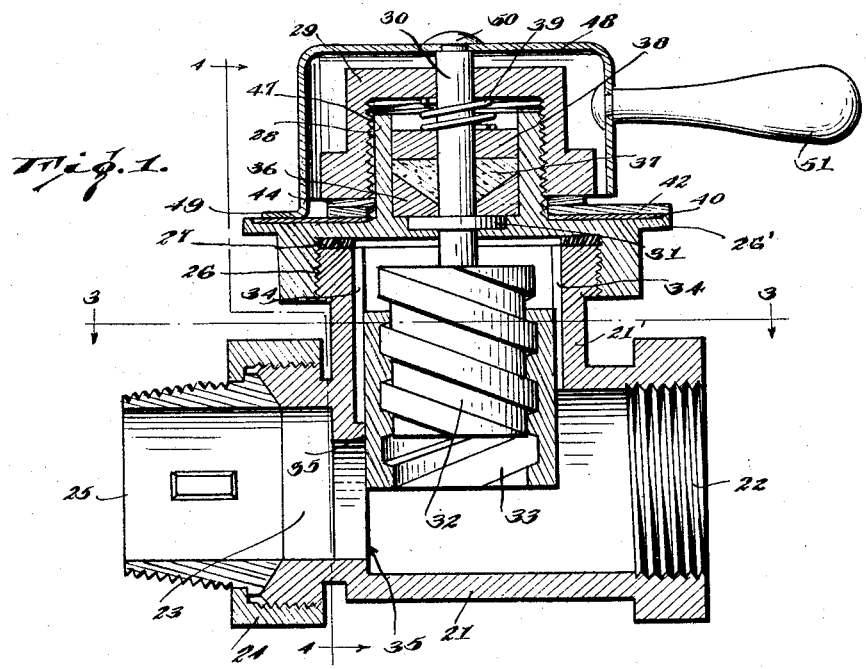

In the drawings, wherein for the purpose of illustration are shown different forms of the invention, the letter A may generally designate a heavy duty type of tractor, such as shown in Figure 1, with which is associated a power take off mechanism, generally referred to as a cable control unit B. The agricultural implement C may be of any approved type. Improved lifting mechanism D is associated with the cable control unit B and the implement C for lifting or suspending the latter to an inoperative relation above ground.

In the form of invention shown in Figures 4 to 6 inclusive, the tractor $A^1$ is of a lighter duty type than that shown in Figure 1, although not necessarily so. It has associated therewith a power take off mechanism E. The implement F may be of the double cutting disc harrow type and with it is associated improved draw bar or draft connecting means G for connecting the same to the tractor. An improved lifting mechanism H is associated with the power take off of the tractor $A^1$ for lifting the implement F to a suspended position. Improved means K is provided between the two sections of the harrow or implement F for cooperatively connecting the same for suspension purposes.

Figure 2:
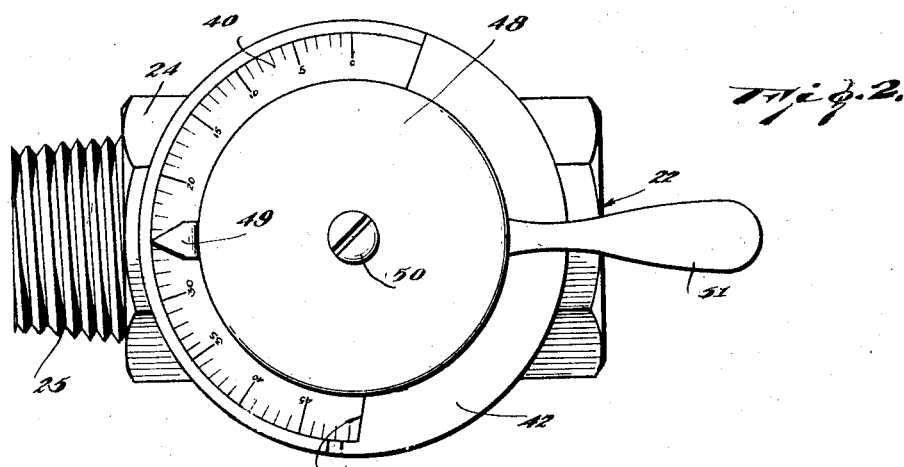
Figure 2 is a plan view of the details shown in Figure 1.
Figure 3:
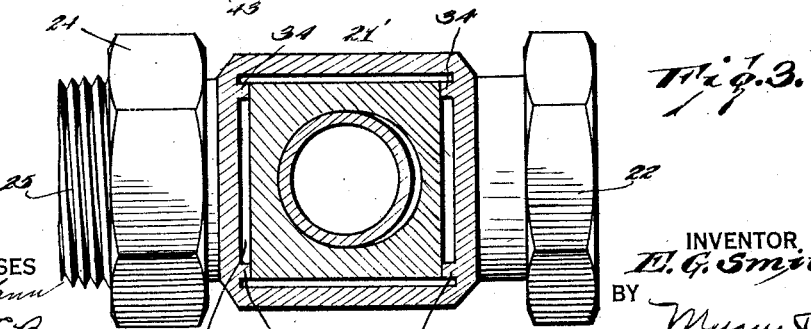
Figure 3 is a side elevation similar to Figure 1, but with the lift mechanism operatively suspending the implement above the ground.

Referring to the form of invention shown in Figures 1, 2 and 3 of the drawings, the tractor is of the heavy duty type, employing an endless tread; the same along the central axis at the rear thereof has a seat 10. Rearwardly of the seat this type of tractor, manufactured by the Caterpillar Tractor Company, Peoria, Illinois, is provided with a power take off mechanism generally referred to as a cable control. This cable control designated at B in Figures 1, 2 and 3 of the drawings embodies a casing 11 having therein a suitable drive mechanism operated by a clutch through a control lever 12. The cable 14 is trained around a series of pulleys 15 as is well known to those skilled in this art. At its rear end below the power take off mechanism the tractor is provided with a draw bar 20. It has a vertically disposed coupling pin 21 to which the implement to be drawn by the tractor may be connected.

While it is to be distinctly understood that the improved lifting means herein described may be associated with any type of implement, I have shown a double section cutting disc harrow C. This type of harrow includes a front section 30 and a rear section 31. The front section 30 includes a frame 33 having disc gang carriers 34 and 35 at each side thereof, which are connected as at 36 to the frame 33. The gang carriers 34

The cross bar 83 of the frame 80 is provided with suitable sheave blocks 110 and 111, which are preferably turnable and receive the cables 108 and 109 in trained relation thereupon. These cables below the sheave blocks are provided with suitable hooks or couplings 120 adapted for connection with chains or flexible cables 121 and 122 respectively.

The chains 121 and 122 connect the front and rear sections of the implement C. Normally they are slack; the front connections of these chains ing with the nut 29, a tongue 46 is projected radially inward from the inner edge thereof and is engaged in a vertical groove 47 formed in the outer side of the gland 28.

The free end of the stem 30 is preferably of reduced irregular form to engage in an opening formed in the top wall of an inverted housing 48 which encloses the packing gland 28 and its associated parts and has an index or pointer 49 projecting angularly outward from its lower open edge and overlying the scale face of the dial 40. With the valve gate 33 in its closed position, the pointer 49 will be in line with the zero graduation of the dial scale while it will traverse the scale and abut the shoulder 43 on the stop plate 42 when the stem 30 is manipulated to raise the gate 33 to fully opened position as is determined by the setting of the shoulder 43 with reference to the dial scale. The housing 48 is secured on the reduced end of the stem 30 in any usual manner, as by means of the screw 50 while an insulated operating handle 51 is secured at one side of the housing 48.

In Figure 6, an alternate form of friction member or washer 44' is shown and in the make up of the same the fingers or tongues 45 (Figure 5) are eliminated and the body merely split at a point diametrically opposite the tongue 46', as at 45', with the split ends sprung slightly apart, substantially as illustrated.

In one form of the valve, as thus constructed and arranged and as best shown in Figures 4, 7, 8 and 9, the outlet side 23 of the body or shell 21, will be provided with a port 52 which is preferably in the form of an equilateral triangle with one side of the same horizontal and the vertex at the bottom. This port 52 is formed in the adjacent wall of the body or shell and its edges are formed by the raised seat 35.

An alternate form of gate 33' and outlet port 52' is depicted in Figures 10, 11 and 12 and here the port may be substantially rhombic or square, while the gate 33' will have its lower edge provided with an inverted V-shaped opening or port 53. The outlet port 52', in this instance, is formed in the side wall of the body or shell nearest the outlet 23 and has opposite corners thereof disposed in horizontal and vertical planes, with those in the vertical plane disposed in alignment with the vertical path of movement of the vertex of the inverted V-shaped port 53 in the near side of the gate 33'.

The dial plate 40 has the graduations of the scale thereon calibrated in a manner that throughout the major portion of the scale the increase in effective port area corresponding to one scale division is greater when the effective port area is large than when it is small. The best arrangement is to have each division through the major portion of the scale correspond to the same percentage increase in effective port area.

In the operation of the valve, with either of the forms of outlet ports 52 or 52', the gate 33 is moved vertically of the body or shell 21 when the handle 51 is grasped and a turning movement is imparted to the stem 30, the housing 48 and the operating element 32. With the initial turning movement of these parts, the index or pointer 49 moves away from the zero graduation on the scale of the dial 40 and the gate 33 vertically within the body or shell 21.

As the gate 33, of the valve having the form of outlet port 52 (Figures 7, 8 and 9), moves vertically of the body or shell 21, the lower edge of the adjacent side wall thereof uncovers the lower end or vertex of the port and as the upward movement continues, the rate of turning of the handle 51 being uniform, the effective area of the port will increase more and more rapidly as the effective area of the port becomes larger and larger and is most rapid just as the full open position is reached. Conversely, as the gate 33 moves downward, the area of the port decreases quickly to a small fraction of its initial valve in order that a maximum modulating of the water flow through the valve body or shell 21 is obtained.

This manner of operation also obtains in the valve having the ported gate 33' and the outlet port 52', except that the vertex of the port 53 in the gate initially registers with the lower corner of the outlet port 52', at the beginning of the vertical opening movement of the gate, and the outlet port 52' is fully opened when the gate port 53 is registered with the upper half of the former.

It will be understood that these valves are to be made in various sizes in order to meet the friction requirement of various sizes of radiators in widely separated parts of the system and that each will be dialed to give a wide range of heat or water flow regulation. Also, that the valves may be made either packed or packless; to conform to either angle or corner types of the same rather than being limited to the straightway type exemplified herein; and to have a wheel or lock and shield type of operating means is desired in lieu of the single hand lever shown. Likewise by suitable changes in the gate and ways to make it shut off tightly, this valve may be made suitable for use with steam or vapor systems. Also it may be made in the bellows packless type if so desired by using a gate closed at the bottom and provided with suitable means for the attachment of the bellows at the top.

Without further description, it is thought that the features and advantages of the invention will be readily apparent to those skilled in the art, and it will of course be understood that changes in form, proportion and minor details of construction may be resorted to, without departing from the spirit of the invention or its scope as claimed.

What is claimed is:—

A valve of the class described comprising a hollow shell having inlet and outlet ports therein, a gate slidably mounted in said shell to control the opening and closing of said outlet port, said gate having a substantially straight edge cooperative with said outlet port which outlet port is substantially V-shaped with its vertex disposed substantially opposite to the direction of motion of said gate to open position, an operating member within said shell in screw threaded engagement with said gate, a stem rigidly fastened to said operating member and projecting outwardly of said shell, means for actuating said stem and operating member to move said gate relatively to said outlet port, and means cooperative with said actuating means for selectively limiting the maximum port area that can be uncovered by the opening movement of said gate and also means cooperative with said limiting means for giving accurate visual indication of the maximum port area that can be uncovered by the aforesaid limited opening movement of said gate.

ELMER G. SMITH.